(12) United States Patent
Yu et al.

(10) Patent No.: US 7,680,853 B2
(45) Date of Patent: Mar. 16, 2010

(54) CLICKABLE SNIPPETS IN AUDIO/VIDEO SEARCH RESULTS

(75) Inventors: Roger Peng Yu, Beijing (CN); Frank Torsten Seide, Beijing (CN); Kaijiang Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 246 days.

(21) Appl. No.: 11/401,048

(22) Filed: Apr. 10, 2006

(65) Prior Publication Data

US 2007/0255565 A1    Nov. 1, 2007

(51) Int. Cl.
G06F 17/30    (2006.01)

(52) U.S. Cl. .................. 707/708; 704/235; 704/270; 704/276; 709/219

(58) Field of Classification Search ............... 707/3; 709/219; 704/270
See application file for complete search history.

(56) References Cited

U.S. PATENT DOCUMENTS

| | | | |
|---|---|---|---|
| 5,630,017 A * | 5/1997 | Gasper et al. ............... | 704/276 |
| 6,006,183 A * | 12/1999 | Lai et al. .................... | 704/235 |
| 6,181,351 B1 * | 1/2001 | Merrill et al. ............... | 345/473 |
| 7,089,188 B2 * | 8/2006 | Logan et al. ................ | 704/270 |
| 2005/0216443 A1 * | 9/2005 | Morton et al. ................ | 707/3 |
| 2006/0116997 A1 * | 6/2006 | Yu et al. ....................... | 707/4 |
| 2006/0149558 A1 * | 7/2006 | Kahn et al. .................. | 704/278 |
| 2007/0005569 A1 * | 1/2007 | Hurst-Hiller et al. .......... | 707/3 |
| 2007/0106646 A1 * | 5/2007 | Stern et al. ................... | 707/3 |
| 2007/0106760 A1 * | 5/2007 | Houh et al. .................. | 709/219 |

OTHER PUBLICATIONS

Application and Drawings from U.S. Appl. No. 11/300,735, filed Dec. 15, 2005.

* cited by examiner

*Primary Examiner*—Don Wong
*Assistant Examiner*—Sheree N Brown
(74) *Attorney, Agent, or Firm*—Theodore M. Magee; Westman, Champlin & Kelly, P.A.

(57) ABSTRACT

Search results are provided in a format that allows users to efficiently determine whether audio or video documents identified from a search query actually contain the words in the query. This is achieved by returning snippets of text around query term matches and allowing the user to play a segment of the audio signal by selecting a word in the snippet. In other embodiments, markers are placed on a timeline that represents the duration of the audio signal. Each marker represents a query term match and when selected causes the audio signal to begin to play near the temporal location represented by the marker.

15 Claims, 12 Drawing Sheets

CLICKABLE SNIPPETS IN AUDIO/VIDEO SEARCH RESULTS

BACKGROUND

Currently, search engines are used to search large networks, such as the internet, for textual documents that are relevant to a user. Typically, the user types in one or more query words and the search engine accesses an inverted index to locate the network documents that contain the words.

Some search engines are available that allow the user to search for audio documents or video documents that contain audio signals. In order to perform this search function, the search engine first performs speech recognition on the audio signal to form a string of words represented by the audio signal. The string of words is then indexed.

Because speech recognition is imperfect, the documents identified by the search engine may not actually contain the search query terms.

The discussion above is merely provided for general background information and is not intended to be used as an aid in determining the scope of the claimed subject matter.

SUMMARY

Search results are provided in a format that allows users to efficiently determine whether audio or video documents identified from a search query actually contain the words in the query. This is achieved by returning snippets of text around query term matches and allowing the user to play a segment of the audio signal by selecting a word in the snippet. In other embodiments, markers are placed on a timeline that represents the duration of the audio signal. Each marker represents a query term match and when selected causes the audio signal to begin to play near the temporal location represented by the marker.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
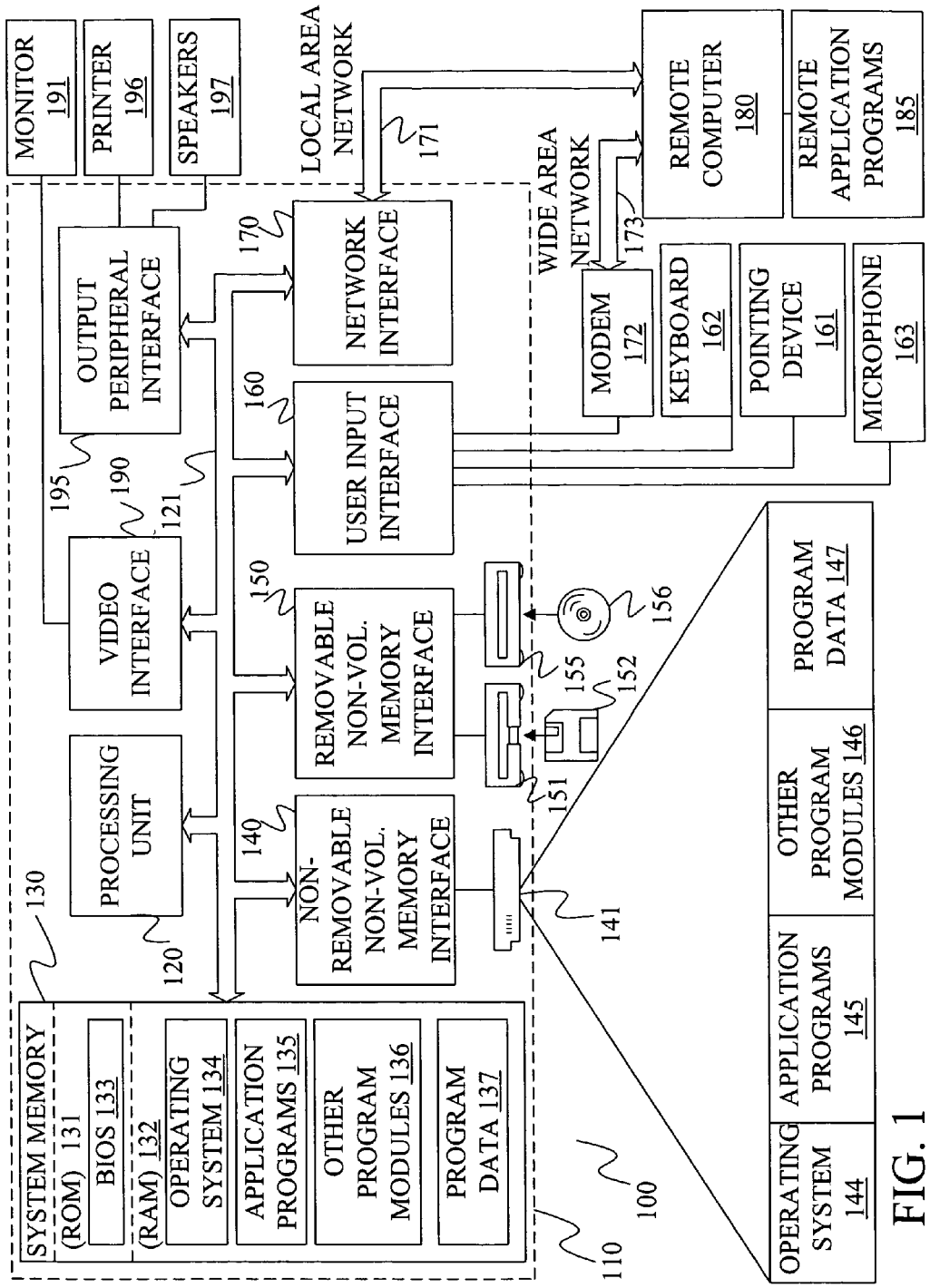
FIG. 1 is a block diagram of one computing environment in which some embodiments may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the claimed subject matter. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
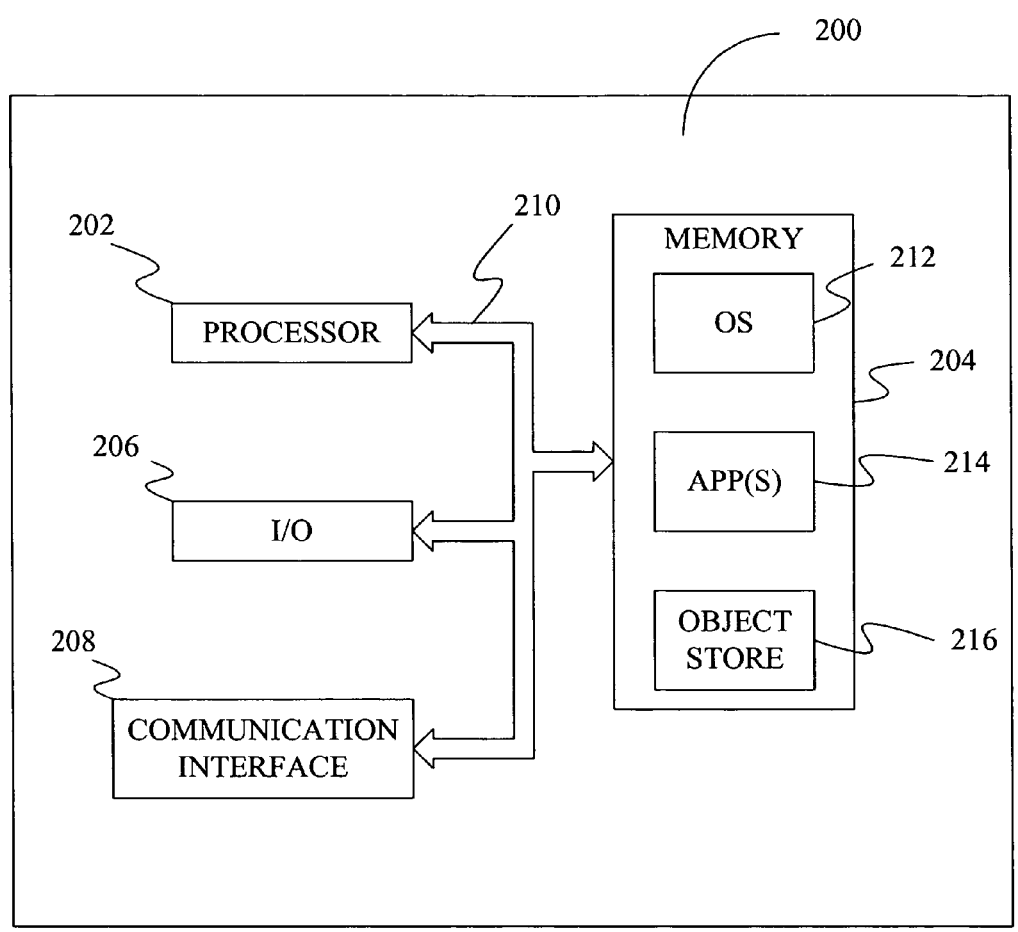
FIG. 2 is a block diagram of an alternative computing environment in which some embodiments may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Embodiments provide search results in a format that allows users to efficiently determine whether audio or video documents identified from a search query actually contain the words in the query. In particular, embodiments allow users to quickly identify and play segments of the audio/video document that are likely to include the words in the query without having to listen to the entire audio signal and without having to read through the entire text recognized from the audio signal. This is achieved by returning snippets of text around query term matches and allowing the user to play a segment of the audio signal by selecting a word in the snippet. In other embodiments, markers are placed on a timeline that represents the duration of the audio signal. Each marker represents a query term match and when selected causes the audio signal to begin to play near the temporal location represented by the marker.

Figure 3:
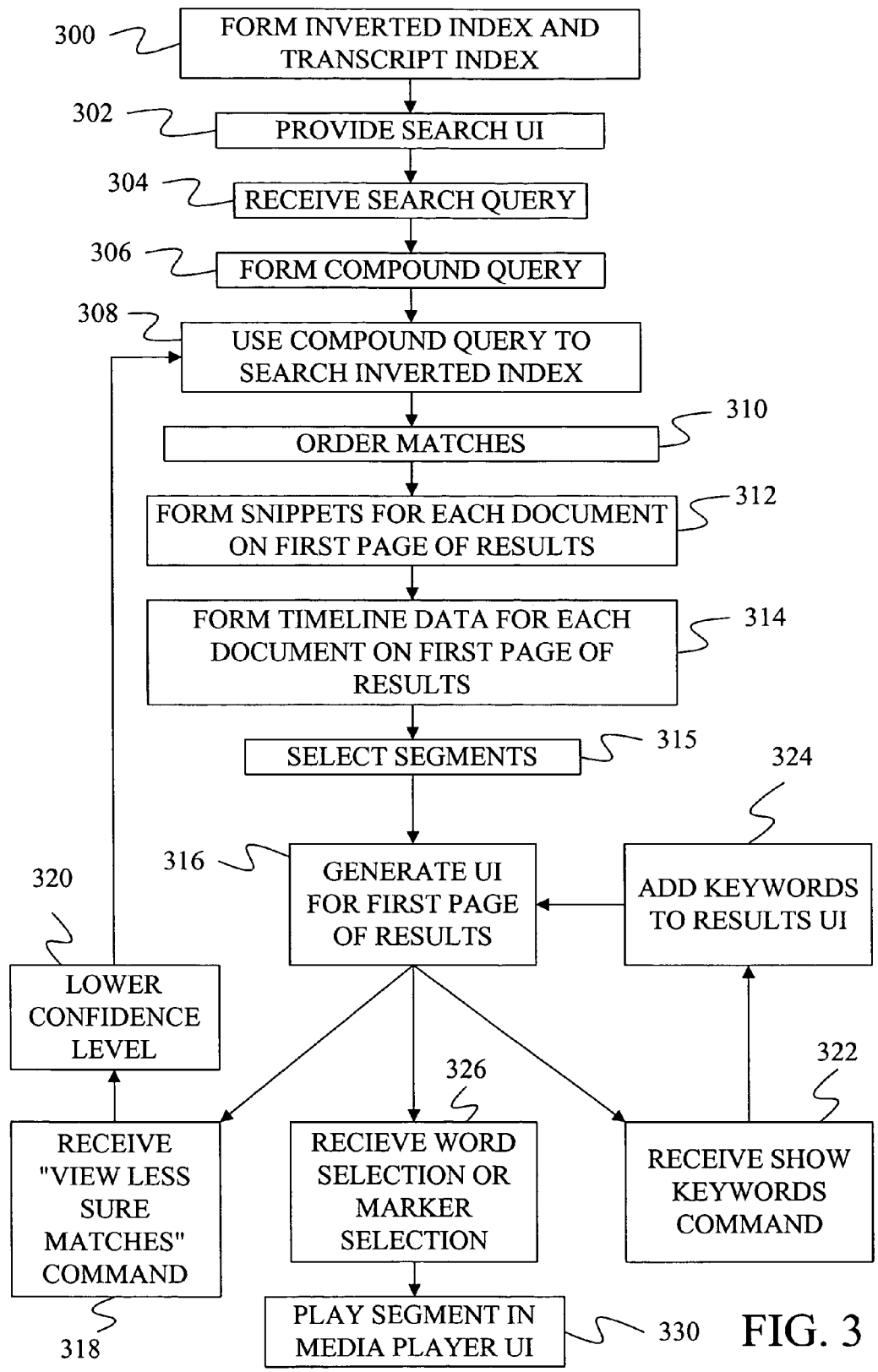
FIG. 3 is a flow diagram of a method of generating and using a user interface.

FIG. 3 provides a flow diagram of a method for training and using a search system under one embodiment. The process of FIG. 3 starts at step 300 where an inverted index and a transcript index are formed.

Figure 4:
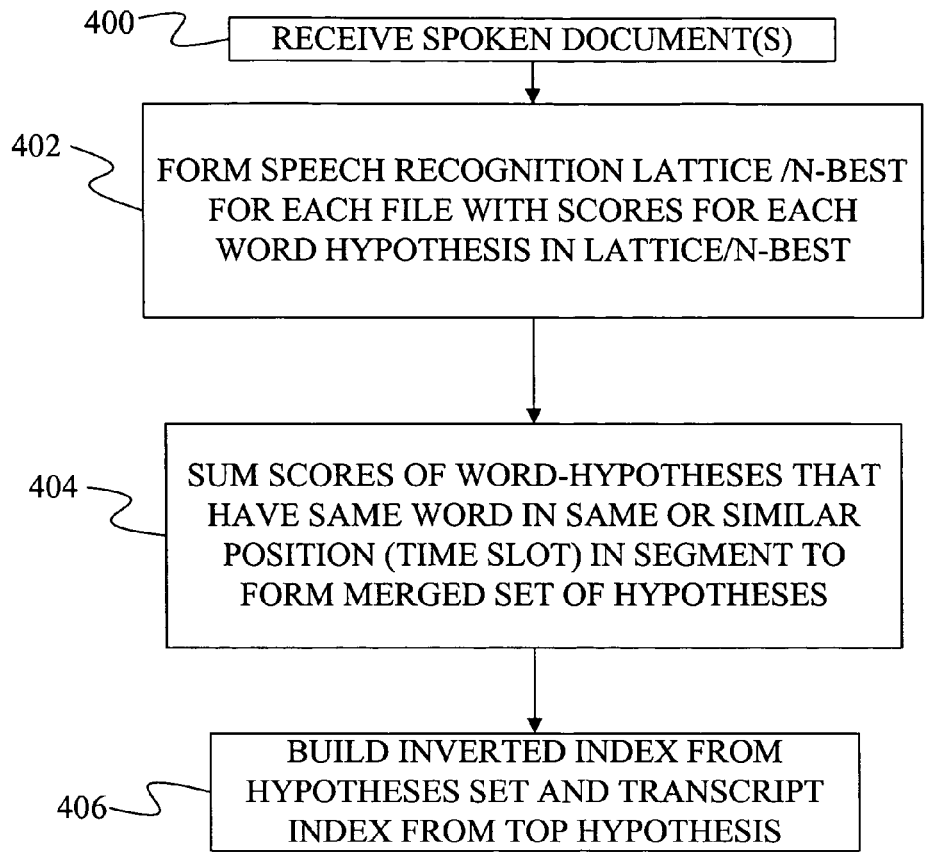
FIG. 4 is a flow diagram of a method for forming an inverted index and a transcript index.
Figure 5:
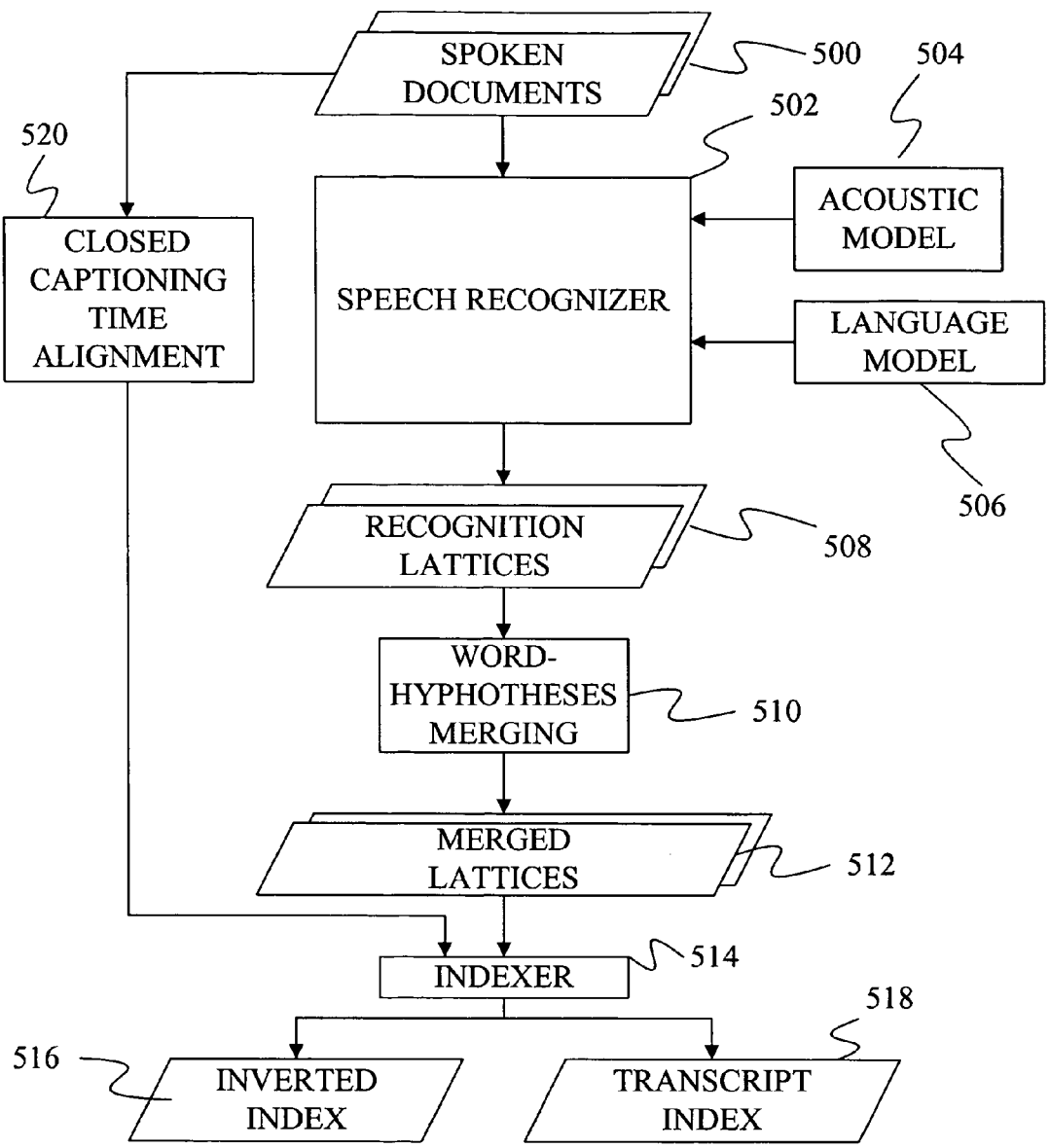
FIG. 5 is a block diagram of elements used to form an inverted index and a transcript index.

FIG. 4 provides a flow diagram of a method of forming an inverted index and a transcript index and FIG. 5 provides a block diagram of elements used to form an inverted index and a transcript index.

In step 400 of FIG. 4, spoken documents 500 of FIG. 5 are received. In general, a spoken document is a collection of speech signals that are related to each other in some manner. For example, speech signals that occur at a meeting, speech signals associated with a lecture, or speech signals associated with a multimedia document such as a movie or a multimedia presentation. To form spoken documents 500, some embodiments separate the speech content from other content in a multimedia document. For example, the speech content may be removed from a movie to separate it from the video and musical content of the movie. When the spoken document represents only the speech content of a multimedia document, a mapping may be stored that links the spoken document to the multimedia document. This allows a path to the multimedia document to be returned in the search results. In other cases there is text meta-data (title, abstract, author, description) that comes with a given spoken document.

Spoken documents 500 may be stored so that all of the documents can be processed at the same time or individual documents may be received and processed separately. In other embodiments, each document is received in a streaming manner and is indexed without having to store the spoken document.

Each of the spoken documents 500 is provided to a speech recognizer 502, which uses an acoustic model 504 and a language model 506 to decode each spoken document into an N-best recognition lattice 508 of possible text sequences at step 402 of FIG. 4. Each N-best recognition lattice 508 includes a most likely sequence of words that is associated with a path through the lattice as well as alternative sequences of words along other paths through the lattice. For at least some words in the lattice, there is an alternative word or words that span the same temporal period in the audio signal.

Typically, speech recognizer 502 performs the recognition based on a sequence of feature vectors that represent the speech in the spoken documents. Under one embodiment, the feature vectors used by the speech recognizer are formed by first converting an analog speech signal into digital values using an analog-to-digital converter. In several embodiments, the analog-to-digital converter samples the analog signal at 16 kHz and 16 bits per sample, thereby creating 32 kilobytes of speech data per second. These digital values are provided to a frame constructor, which, in one embodiment, groups the values into 25 millisecond frames that start 10 milliseconds apart. The frames of data created by the frame constructor are provided to a feature extractor, which extracts a feature from each frame.

Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that embodiments are not limited to these feature extraction modules and that other modules may be used within the context of disclosed embodiments.

The steps needed to form the feature vectors can be performed entirely by speech recognizer 502, or some or all of the steps may be performed when generating spoken documents 500. Thus, spoken documents 500 may be stored as analog signals, digital signals, frames of digital signals, or feature vectors.

During recognition, each feature vector is applied to acoustic model 504, which provides a probability of each of a set of phonetic units given an input feature vector. The acoustic probability of a word is determined by combining the probabilities of the phonetic units that form the word. In addition, each word receives a language model score from language model 506 that indicates the probability of a word or a sequence of words appearing in a particular language. Using the scores provided by acoustic model 504 and language model 506, speech recognizer 502 is able to include a word score for each word in recognition lattice 508. Note that in most embodiments, speech recognizer 502 prunes unlikely word sequences from lattice 508 based on the word scores.

At step 404, word-hypotheses merging 510 simplifies each recognition lattice 508 by combining multiple occurrences of the same word that cover the same time frame in the lattice. For example, if two paths through the lattice both have the word "Microsoft" designated for the same time period, these two paths are merged at the word "Microsoft" so that there is only one occurrence for the word "Microsoft" at that time period. This reduces the amount of information that must be indexed. During this merging, the scores for the word hypotheses that are merged are summed to form a new score for the merged word in the lattice. This produces merged lattices 512.

At step 406, an indexer 514 forms inverted index 516 and transcript index 518 from merged lattices 512. Inverted index 516 is formed by providing an entry for every word in merged lattices 512. Each entry contains the word and information identifying each occurrence of the word in merged lattices 512. For each occurrence, this information includes a document identifier that identifies the spoken document, a representation of the start and end times for the word in the audio signal, and the word score associated with that occurrence of the word. Transcript index 518 is formed by selecting the most likely path through each merged lattice 512 based on the word scores. For each path, an entry is formed for each word slot along the path. Each entry includes a document identifier, a start and end time for the slot, and the word that is found in the slot. Preferably, transcript index 518 is sorted by document and then start and end times so that sequences of words along the most likely path can be easily retrieved from transcript index 518.

In another embodiment, spoken documents 500 include closed captioning. Closed captioning is a textual representation of the audio content of the spoken documents. In many cases, close captioning is only roughly aligned with the audio content in the spoken document. For instance, an entire text sentence in the closed captioning will be aligned with the beginning of the audio segment that contains that sentence.

To produce a more refined alignment, the closed captioning is time-aligned to the spoken document by time alignment unit 520. Such forced alignment is well known in the art and involves using a speech recognizer to align the acoustic feature vectors with the acoustic states of the phonetic units identified in the closed captioning. The alignment that provides the highest probability for the phonetic units in the closed captioning is used as the final alignment.

Once the acoustic signal of spoken documents 500 has been aligned to the closed captioning, the start and end times of the words in the closed captioning can be used to form inverted index 516 and transcript index 518. In most cases, a single alignment is identified so that inverted index 516 and transcript index 518 are both formed from a single path instead of a lattice of paths.

Figure 6:
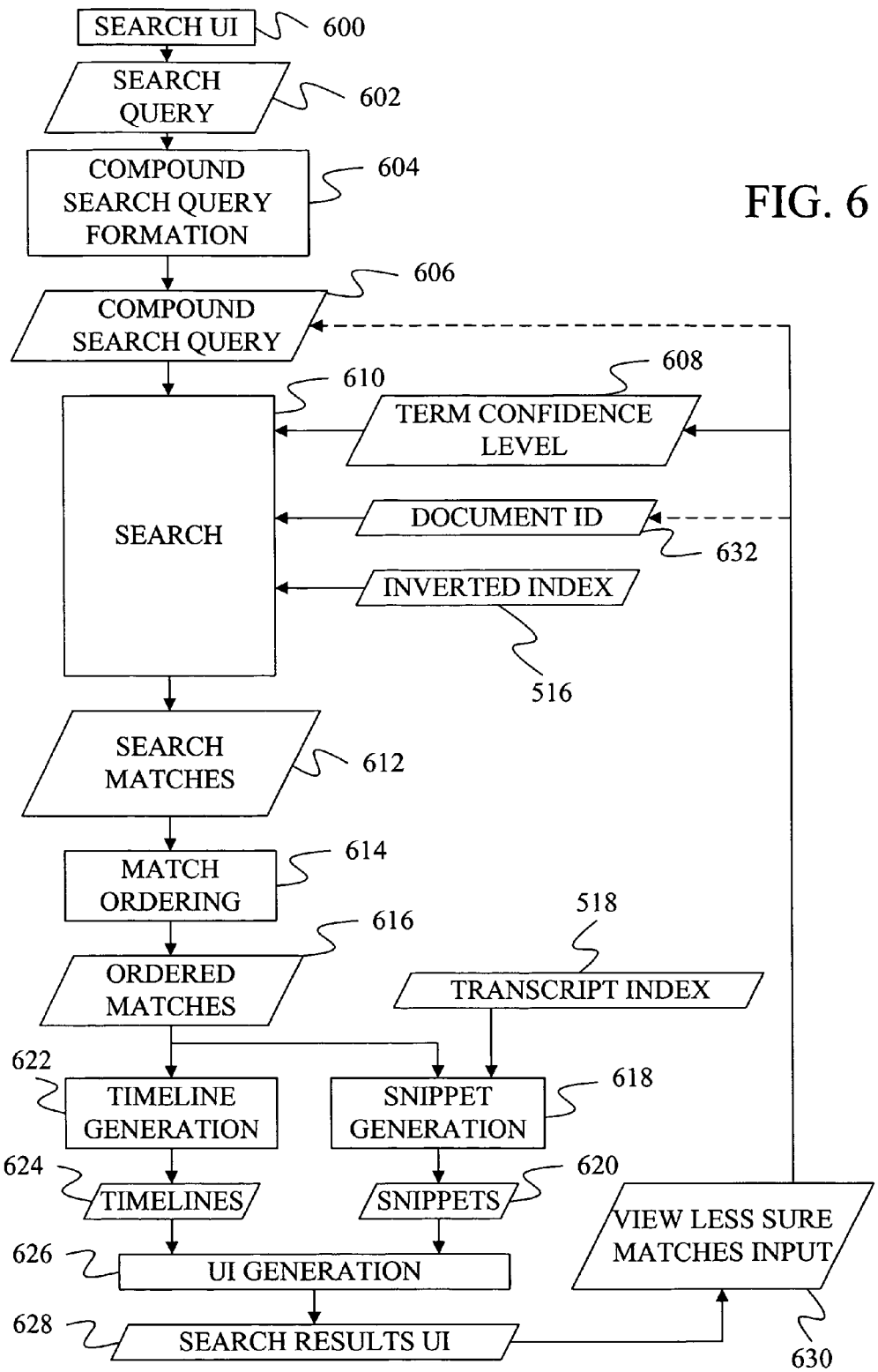
FIG. 6 is a flow diagram of a method of performing a search and providing search results.

After the inverted index and the transcript index have been formed, step 300 of FIG. 3 is complete and the indices can now be used to perform searching. FIG. 6 provides a block diagram of elements used to perform searches and display search results and the elements of FIG. 6 are discussed below in connection with the process of FIG. 3.

Figure 7:
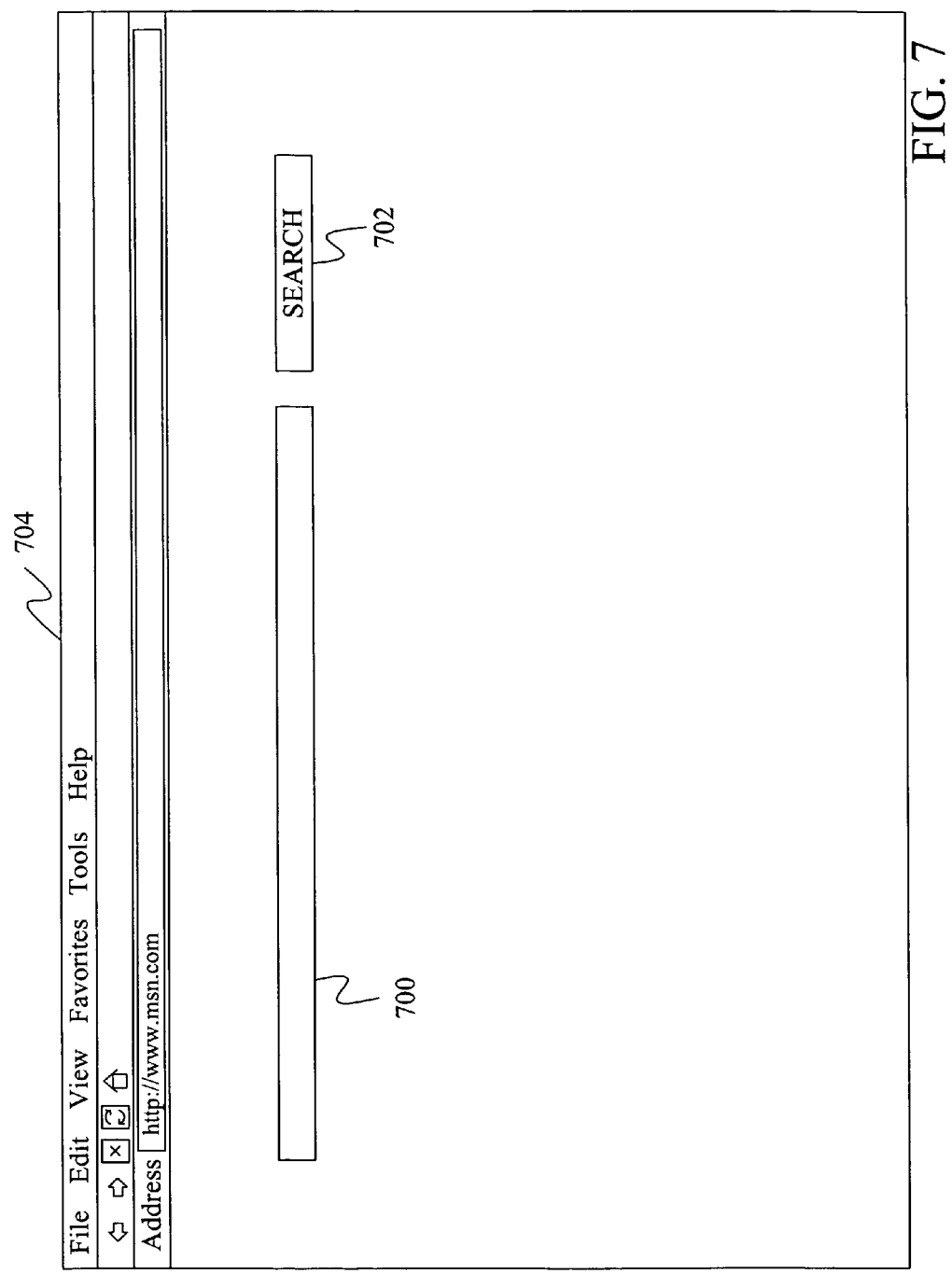
FIG. 7 is an example of a search user interface.

At step 302 of FIG. 3, a search user interface 600 of FIG. 6 is generated. An example of such a search user interface is shown in FIG. 7 and includes a query box 700, into which a user may type a query and a search button 702, which the user may select to submit their query. In the embodiment shown in FIG. 7, the user interface is shown within a network browser window 704 and is transmitted across a network, such as the Internet, as a page written in a markup language such as HTML or XML.

At step 304, search query 602 is received. At step 306, the words in the search query are used by a compound search query formation unit 604 to form a compound search query 606. Compound search query 606 includes a set of query terms connected by various operators to indicate relationships between the query terms. A query term can have one or more words. For query terms that include more than one word, the words are tied together by an operator to indicate their relationship within the query term. For example, words that must be found next to each other can be grouped within quotation marks and words that must be separated by fewer than n words can be tied together by a "w/n" operator.

In one embodiment, each word in the query is placed as a separate query term connected by a logical OR operator to other query terms in compound search query 606. In addition, each combination of word subsequences in the search query is placed as a separate search term in the compound query. In further embodiments, pairs of words in the search query are connected by an operator that indicates proximity between the words to form additional query terms. For example, the proximity operator may indicate that the two words are to appear within two words of each other in order for there to be a match.

At step 308, compound query 606 of FIG. 6 is used with a term confidence level 608 by a search unit 610 to search inverted index 516. Term confidence level 608 indicates the combined word score that must be assigned to a term in inverted index 516 in order for the term to be considered a match for a search term in compound search query 606. Under one embodiment, when search terms have multiple words, each word must have a word score that exceeds the word score associated with the term confidence level. In other embodiments, the word scores for such multiple-word search terms are averaged and the average must exceed the word score associated with the confidence level in order for there to be a match. In further embodiments, word scores for multiple-word search terms are increased before being compared to the term confidence level. This increase in the word score is based on the observation that the search query provides additional language model information that is not captured in language model 506.

The search performed by search unit 610 may include any known search strategies for searching an inverted index 516. For each occurrence of a search term in the inverted index that exceeds the word score associated with the term confidence level, search unit 610 retrieves a document id for the document in which the term is found, the start and end times of the search term in the document, and the word score for the search term. These values are stored with the search term as search matches 612.

At step 310, the search matches 612 are ordered by a match ordering unit 614 to form ordered matches 616. Under one embodiment, the matches are ordered first based on document ID and then based on temporal location within a document.

Under one embodiment, the search results provided to the user include textual snippets that include words around the matching search term where all the words in the snippet are selectable links that when selected by the user initiate playback of the corresponding audio or video file from the time point in the file corresponding to the selected word. By providing such snippets, embodiments allow the user to quickly verify that the spoken document actually contains the words represented in the snippet by allowing the user to quickly identify and play the segment of the audio signal that the search system has indicated contains the search term.

The formation of such snippets for the search results is shown at step 312 in FIG. 3 and is performed by snippet generation 618 of FIG. 6. A flow diagram for forming such snippets is shown in FIG. 8.

Figure 8:
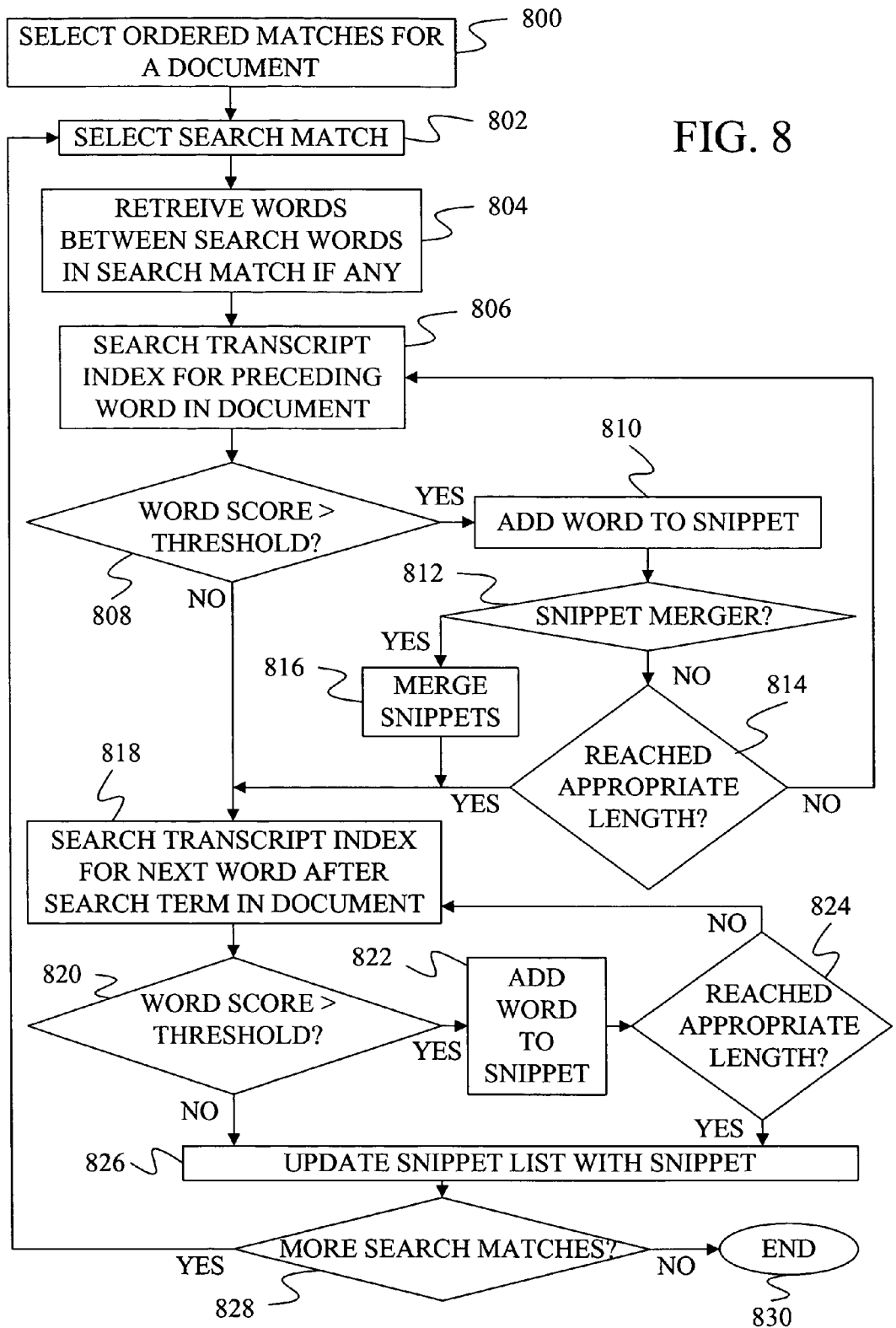
FIG. 8 is a flow diagram of a method of forming a clickable snippet.

In step 800 of FIG. 8, the ordered matches for one of the documents are selected at step 800. At step 802 the first search match is selected. For search matches that are based on proximity search terms, such as one word within five words of another word, the words in the document between the two query words are retrieved at step 804. These words are retrieved using transcript index 518. In particular, beginning with the ending time of the first query word in the search term, every word in transcript index 518 between that time period and the starting time period of the other query word in the search term is retrieved from the transcript index 518.

After step 804, the method of FIG. 8 begins to add words to the beginning of the snippet by looking for words that precede the first word of the search match along the most likely path through the recognition lattice. This is done at step 806 by searching transcript index 518 for the word in the document that has an end time that matches the start time of the first word in the search match. Note that the search match is based on the inverted index, which is formed from the recognition lattice, and the other words in the snippet are determined from the transcript index, which is based on only the most likely path through the lattice. As a result, the only words in the snippet that may not be from the most likely path through the lattice will be those that form part of a search match.

If there is a word that precedes the first word of the search match, the word, its starting and end time points, and its word score are retrieved from transcript index 518. The retrieved word score is then compared to a threshold at step 808. This threshold is used to ensure that only words with a high enough word score are returned in the snippet to help reduce confusion that might otherwise occur if a large amount of erroneous words are returned in the snippet. Note that this threshold does not have to be the same as term confidence level 608.

If the word score of the preceding word exceeds the threshold, the word is added to the snippet in step 810 by placing it before the first word of the search match.

The current snippet and the previous snippet, if any, are then evaluated at step 812 to determine if the two snippets should be merged together. If there is no previous snippet, no merger is possible and the process continues at step 814. If there is a previous snippet, the ending time point for the last word in the previous snippet is compared to the starting time point for the first word in the current snippet at step 810. If the two time points match, the two snippets are merged together at step 816.

If the current snippet is not to be merged with the previous snippet, the number of words added to the snippet before the first word in the search term is evaluated at step 814 to determine if the appropriate length for the portion of the snippet before the search term has been reached. If the appropriate length has not been reached, the process returns to step 806 to select the word in the transcript index that precedes the last word added to the snippet along the most likely path through the lattice. Steps 808, 810, 812, 814 and 816 are then repeated for the new word.

If a word score for a word from the transcript index is below the threshold at step 808 or if the current snippet is merged with the previous snippet at step 816, or if the number of words added to the snippet before the search term equals the desired number of words at step 814, the process continues at step 818 where the transcript index is searched for the first word after the last word in the search match. This search involves looking for the term in the transcript index that has a starting time that matches the ending time of the last word in the search match.

At step 820, the word score for the identified word is compared to the threshold to determine if it exceeds the threshold or not. If the word score does not exceed the threshold, the word is not added to the snippet. If the word score exceeds the threshold, the word is added to the snippet at step 822 by appending it to the end of the snippet.

At step 824, the number of words after the last word in the search match are counted to determine if the end portion of the snippet is a desired length. If the end portion is the desired length, the process returns to step 818 and selects the next word in the transcript index. Steps 820, 822 and 824 are then repeated. When a word from the transcript index has a word score that is less than the threshold at step 820 or the desired length for the segment of the snippet after the last word in the search match is reached at step 824, the snippet is complete and it is added to the snippet list 620 at step 826.

At step 828, the process determines if there are more search matches for the current document. If there are more search matches, the next search match is selected by returning to step 802 and the process repeats for the new search match. When there are no further search matches for the current document, the process ends at step 830.

After the snippets have been formed at step 312, the process of FIG. 3 continues at step 314 where a timeline generation unit 622 forms timeline data 624 that graphically represents the time points of the spoken document where search matches have been found. Specifically, data is generated for positioning markers along a graphical representation of the time span of the spoken document, which in one embodiment takes the form of a timeline. A process for forming such timeline data is shown in the flow diagram of FIG. 9.

Figure 9:
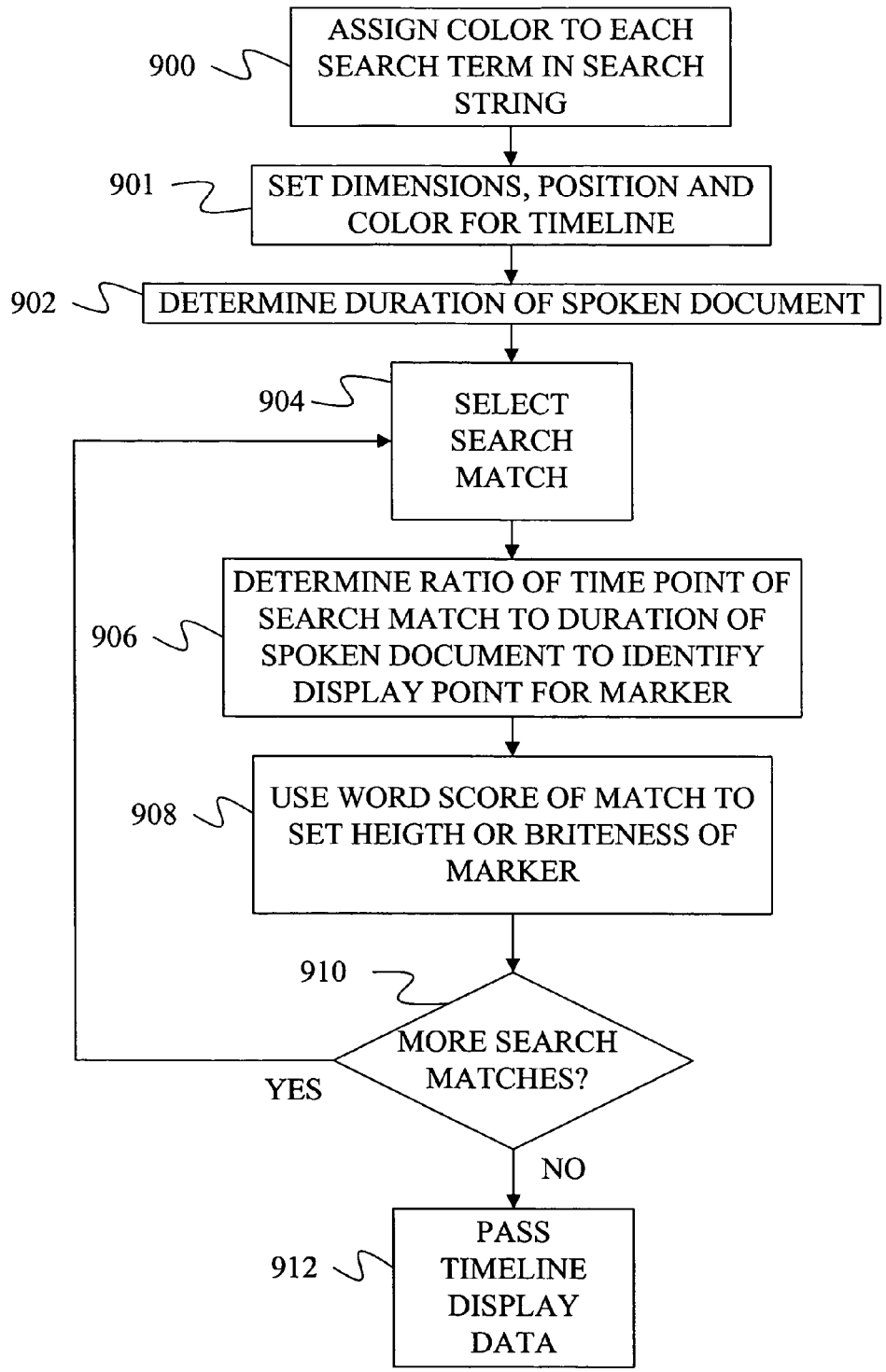
FIG. 9 is a method of forming a clickable timeline.

At step 900 of FIG. 9, a color is assigned to each search term in the compound search query and at step 901, the dimensions, position and color of the timeline are set.

At step 902, the duration of the spoken document is determined. At step 904, a search match in the spoken document is selected. For the selected search match, a ratio of the starting time point of the search match to the duration of the spoken document is determined to identify a position along the timeline for a marker representing the search match at step 906. In particular, the location of the marker along the timeline is set by multiplying the ratio of the time point of the search match to the duration of the spoken document by the length of the timeline that is to be displayed.

At step 908, the word score for the search match is used to set the height or brightness of the marker on the timeline. In particular, the marker is made taller for search matches that have a higher word score and/or is made brighter for search matches that have a higher word score.

After the height and/or brightness of the marker has been set at step 908, the method of FIG. 9 determines if there are more search matches at step 910. If there are more search matches, the next search match is selected at step 904 and steps 906 and 908 are performed for the new search match. When there are no further search matches at step 910, timeline generation unit 622 passes timeline data 624 to user interface generation unit 626 at step 912.

At step 315 of FIG. 3, user interface generation unit 626 identifies segments of the spoken document to play for each word in the snippets and each marker. The starting time point for the segment can be selected by simply selecting starting time point for the word. Alternatively, the starting point for the segment can be selected so that the segment includes words before the selected word or marker. This provides the user with more context to make a better determination of whether the spoken document actually includes the selected term. The end of the segment can also be determined and in some embodiments is simply set to the end of the spoken document.

At step 316 of FIG. 3, user interface generation unit 626 generates a search results user interface 628 that includes the snippet information and the timeline data formed at steps 312, 314, and 315. Under one embodiment, interface generation unit 626 generates the user interface as a markup language page that may be transmitted across a network, if necessary, and displayed in an application such as a network browser.

During the generation of the user interface, generation unit 626 creates links to the segments of the spoken document identified for each word in the snippets and each marker on the timeline at step 315. By selecting the words or the markers, the user will be able to activate the links and thereby play the segment of the spoken document.

Under one embodiment, user interface generation 626 includes a selectable item to allow the user to view less sure matches. When a view less sure matches input 630 is received at step 318 of FIG. 3, the input is used to lower the term confidence level 608 at step 320. The view less sure matches input 630 can include a document ID 632 and compound search query 606. Providing the compound search query within the view less sure matches input gives search unit 610 access to the compound search query without requiring search unit 610 to store the query. If the document ID is not provided, search unit 610 uses the lower term confidence level 608 and the compound search query 606 to search the inverted index and perform steps 308, 310, 312, 314, 315 and 316. Because the term confidence level 608 is lower during this search, different search results will be obtained.

If the document ID 632 is provided, search unit 610 can limit the new search to just the document represented by document ID 632. In such cases, the snippets and timelines displayed for other documents remain unchanged and the snippets and timelines for the document represented by document ID 632 are updated with the new search results formed with the lower term confidence level.

Figure 10:
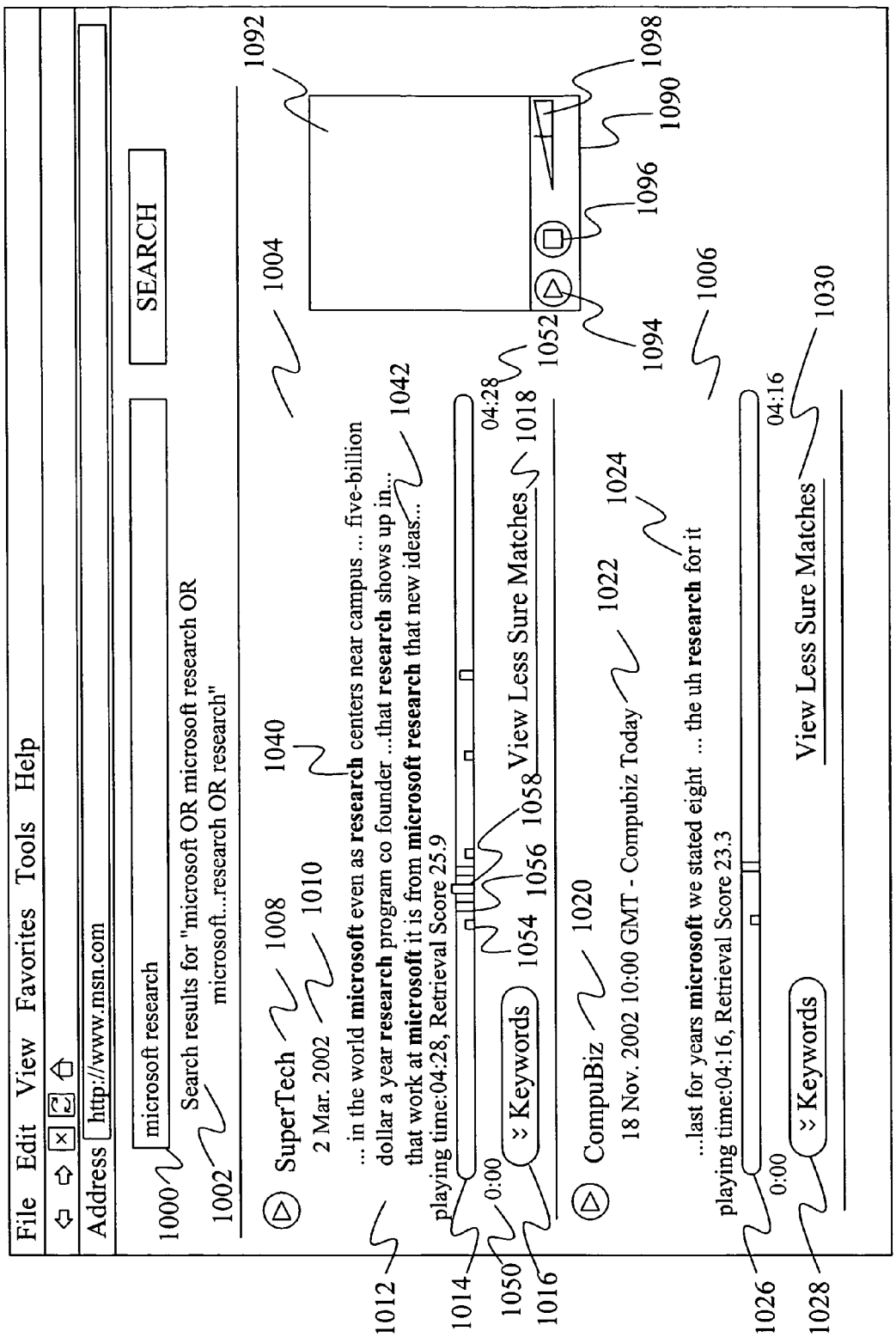
FIG. 10 is an example of a search results user interface under one embodiment.

In one embodiment, user interface generation 626 forms a user interface 628 so it has the appearance of the user interface of FIG. 10.

In the search results user interface of FIG. 10, the search query is shown in a query box 1000. Below the query box is the compound search query 1002, which shows each of the search terms used to perform the search separated by a logical "OR".

The search results user interface of FIG. 10 also includes two document results areas 1004 and 1006. Document result area 1004 includes a document title 1008, document meta data 1010, which includes the date of the document, snippets 1012, timeline 1014, keywords button 1016 and view less sure matches link 1018.

Document results area 1006 includes document title 1020, metadata 1022, snippets 1024, timeline 1026, keywords button 1028 and view less sure matches link 1030.

Within snippets 1004 and 1024, search terms are shown bolded while words that are not search terms are shown in regular font. The snippets are grouped together in a paragraph but are separated from each other by an ellipse.

Snippet 1042 in snippets 1004 is for the search term "microsoft . . . research", which matches when ever "Microsoft" is followed by "research" with no more than five words between the two search words. Snippet 1042 is a merged snippet in which a snippet for the search term "Microsoft" has been merged with a snippet for the search term "Microsoft research".

Timeline 1014 has a start time 1050 and an end time 1052 and includes markers 1054, 1056 and 1058. Each marker corresponds to the temporal location of a search term in the spoken document. Each of the markers has a different height representing a different word score for each search term match.

Figure 11:
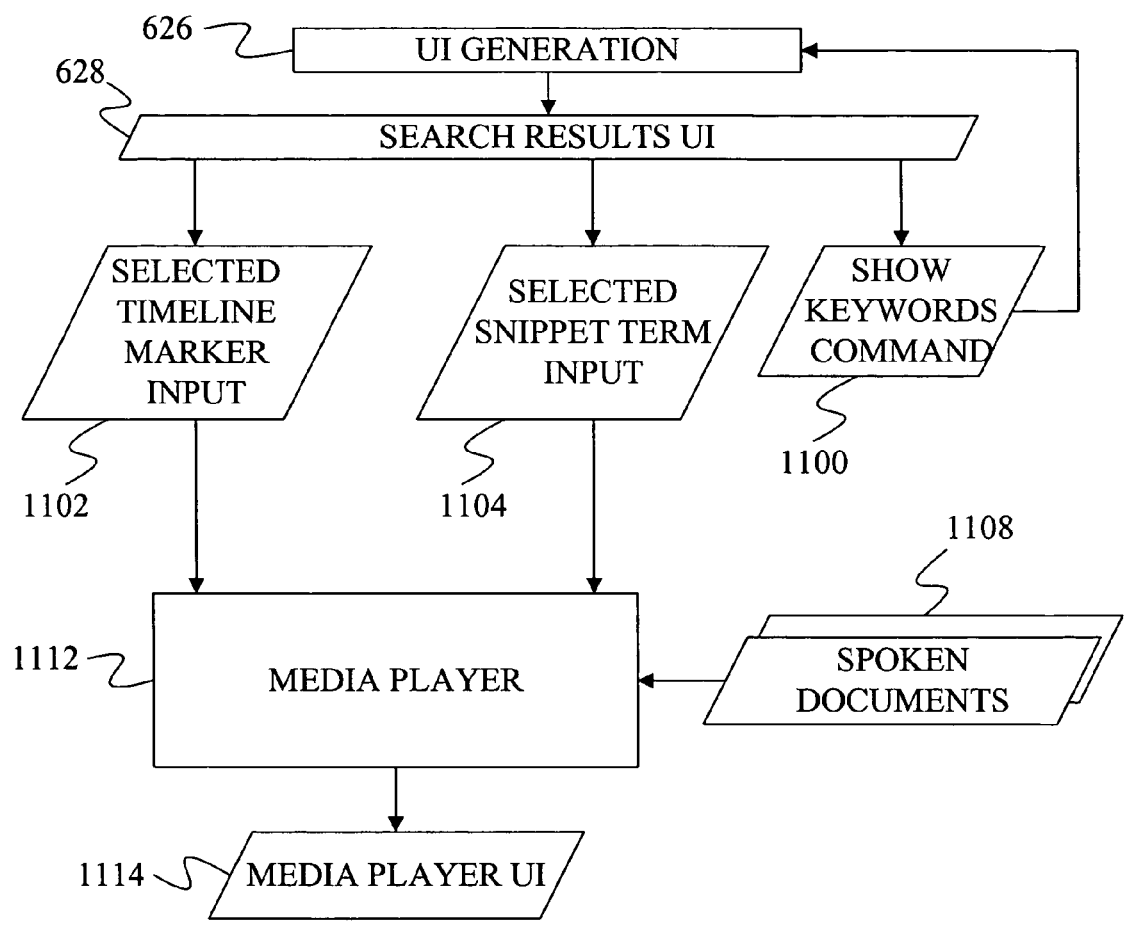
FIG. 11 is a block diagram of elements used to identifying a segment of a spoken document.
Figure 12:
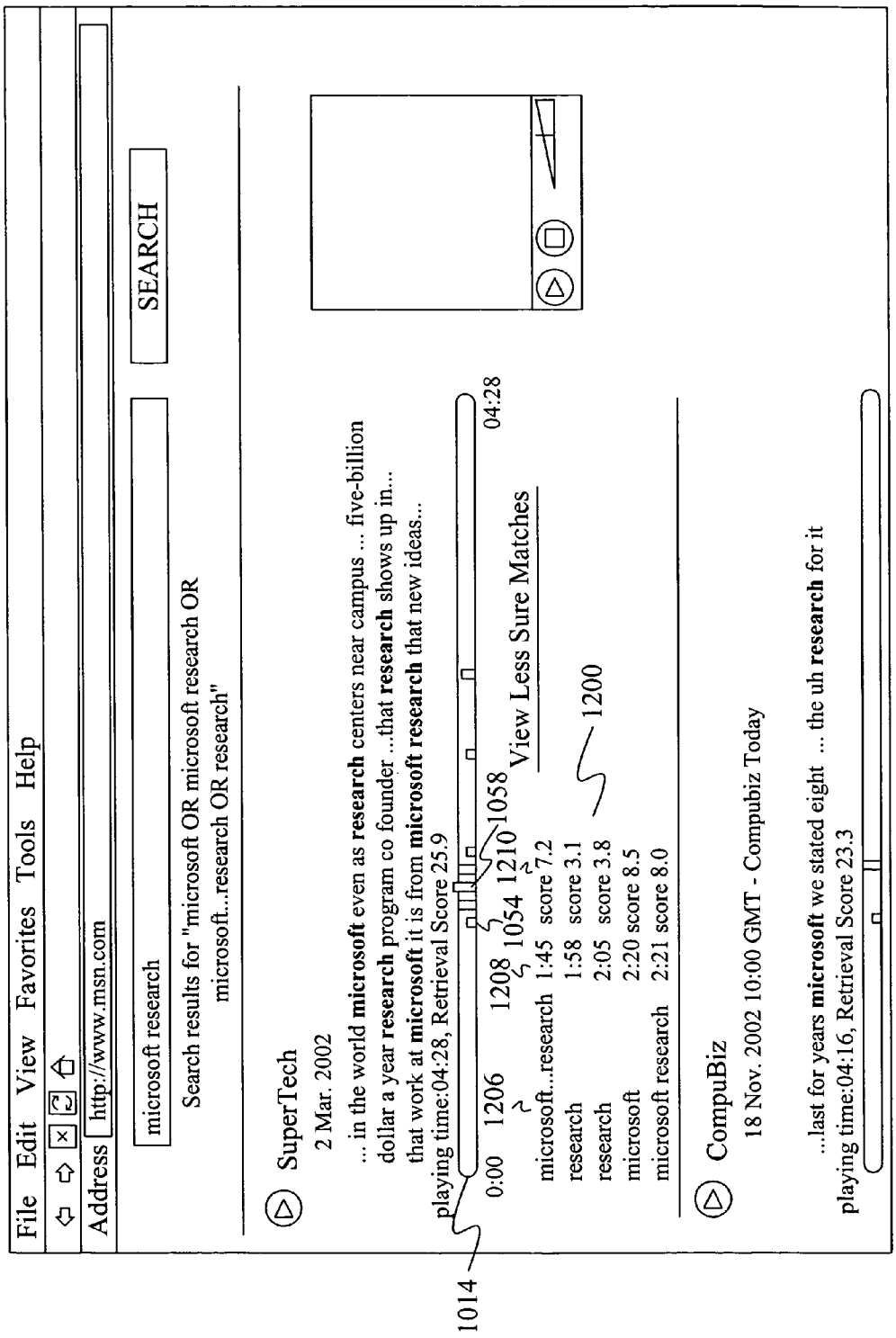
FIG. 12 is an example of a user interface with expanded keywords.

Keywords buttons 1016 and 1028 of FIG. 10 generate a show keywords command 1100 as shown in FIG. 11. Upon receiving the show keywords command at step 327 of FIG. 3, the keywords that correspond to the markers on the timeline are added to the user interface at step 324 by UI generation 626 to form a new search results user interface 628. For example, if keywords button 1016 is selected by the user, a new search results user interface as shown in FIG. 12 is generated in which keywords 1200 that correspond to the markers in timeline 1014 are shown. For example, keyword entry 1202 corresponds to marker 1054 and keyword entry 1204 corresponds to marker 1058. Each keyword entry includes the search terms associated with the marker, such as search terms 1206, the time point in the spoken document at which the search term is found, such as time point 1208 and the word score for the search term in the spoken document, such as word score 1210.

Returning to FIG. 10, each of the words in snippets 1004 and 1024 may be selected by clicking on the term or the marker using a pointing device or by tabbing to the term or the marker and pressing enter on a keyboard. If a term or a marker is selected, the selected timeline marker input 1102 or the selected term input 1104 are received by a media player 1112 as shown in FIG. 11 and as shown in FIG. 3 at step 326.

Media player 1112 uses the information in marker input 1102 or term input 1104 to locate the spoken document 1108 and the starting point within document 1108. Based on the starting point and the document, media player 1112 plays the spoken document through a media player user interface 1114 at step 330. An example of a media player interface is shown in FIG. 10 as media player 1090 which includes a video display area 1092, a play button 1094, a stop button 1096, and a volume control 1098. Those skilled in the art will recognize that the media player user interface could include additional control graphics.

By providing search results as snippets in which the user can click on individual words to begin playback of segments of the spoken document, embodiments make it easier for users to validate that the spoken documents actually contain the words identified in the snippets.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:

receiving a search query comprising at least one query term;

using the query term to retrieve a document identifier and a start time for the query term in an audio signal by accessing an index formed from text recognized from audio signals associated with spoken documents;

using the start time to retrieve a string of words that includes the query term and that was recognized from the audio signal for the document represented by the document identifier; and generating on a display device, a user interface displaying the string of words including displaying the query term such that the string of words displayed in the user interface does not represent the entire time span of the audio signal and at least one word in the string of words is a selectable link such that when a user selects the at least one word in the user interface, playback of the audio signal is initiated at the start time of the query term in the audio signal, and further displaying a timeline having a length representing the duration of the audio signal and displaying a marker for the query term on the timeline to indicate the temporal position of the query term in the audio signal, wherein displaying a marker on the timeline comprises multiplying a ratio of the start time of the query term to the duration of the audio signal by the length of the displayed timeline to determine a location for the marker on the timeline.

2. The method of claim 1 wherein the index is formed from a recognition lattice having multiple recognition paths.

3. The method of claim 2 wherein retrieving a string of words comprises retrieving words other than the query term by selecting words found along a most likely path in the recognition lattice.

4. The method of claim 1 further comprising:
using a query term to retrieve a second position identifier;
using the second position identifier to retrieve a second string of words;
merging the string of words and the second string of words to form a merged string; and
generating the user interface so that it contains the merged string.

5. The method of claim 1 wherein using the query term to retrieve a document identifier and a position identifier comprises comparing a term confidence level to word scores associated with occurrences of the query term in the index and retrieving document identifiers and position identifiers that are associated with word scores that exceed the term confidence level, wherein the word scores are based on probabilities of phonetic units given feature vectors formed from the audio signal.

6. The method of claim 5 further comprising:
determining that the query term comprises a combination of two query words; and
increasing the word scores retrieved from the index for occurrences of the query term before comparing the word scores to the term confidence level.

7. The method of claim 5 further comprising receiving a command to view less sure matches, lowering the term confidence level to form a lowered term confidence level in response to the command and retrieving document identifiers and position identifiers that are associated with word scores that exceed the lowered term confidence level.

8. A computer-readable storage medium tangibly embodying a program of instructions executable by a processor to perform steps comprising:
searching an inverted index formed from words recognized from audio signals to locate query terms in a search query and producing query matches for occurrences of the query terms in the inverted index;
identifying text snippets from the query matches, each text snippet containing at least one query term and at least one word that is not part of the search query, all of the text snippets for an audio signal together representing less than the duration of the audio signal;
displaying the query terms that were used to perform the search;
displaying the text snippets associated with a selected audio signal such that a displayed query term in a displayed text snippet is a selectable link such that when a user selects the query term, playback of the audio signal is initiated at a start time of the query term in the audio signal;
displaying a timeline having a length representing the duration of the selected audio signal and displaying a separate marker for each query match on the timeline to indicate the temporal position of each query match in the selected audio signal, wherein displaying a marker on the timeline comprises multiplying the ratio of the temporal position of the query term to the duration of the selected audio signal by the length of the displayed timeline to determine a location for the marker on the timeline and wherein displaying a marker comprises setting the height of the marker based on a word score for the search match such that the marker is taller for higher word scores and such that different markers on the timeline have different heights;
based on an indication that a user has selected a word in a text snippet, requesting a segment of an audio signal, the segment containing less than the entire time span of the audio signal and starting at the start time of the query term; and
based on an indication that a user has selected a marker on the timeline, requesting a second segment of the audio signal, the second segment containing less than the entire time span of the audio signal.

9. The computer-readable storage medium of claim 8 wherein at least one text snippet comprises at least one word that is not a query term and that is positioned between two query terms.

10. The computer-readable storage medium of claim 8 wherein the computer-executable instructions provide for the further step of requesting a segment of an audio signal, the segment containing less than the entire time span of the audio signal, based on an indication that a user has selected a marker.

11. The computer-readable storage medium of claim 10 wherein the computer-executable instructions provide for the further step of displaying a selectable item to allow a user to request a listing of the query terms represented by markers on the timeline.

12. The computer-readable storage medium of claim 8 wherein the computer-executable instructions provide for the further step of displaying a selectable item to allow a user to change a term confidence level that is used to identify matches between the query terms and text recognized from the audio signal.

13. A method comprising:
a processor determining temporal locations of a query term in a plurality of audio signals; and
generating a user interface on a display device, the user interface comprising a separate timeline for each audio signal and a set of markers for each timeline, wherein each timeline has a length representing a time span of the respective audio signal and the markers for the timeline are positioned along the length of the timeline to show the temporal locations of the query terms within the audio signal, wherein displaying a marker on the timeline comprises multiplying a ratio of a temporal location of the query term to the duration of the audio signal by the length of the displayed timeline to determine a location for the marker on the timeline and setting a brightness value for the marker based on a word score associated with the temporal location of the query term such that the marker is made brighter for a higher word score and such that different markers along the timeline have different brightness values.

14. The method of claim 13 wherein generating a user interface comprises providing a user-selectable item that allows a user to request to see the query terms associated with each marker in the user interface.

15. The method of claim 14 wherein generating a user interface further comprises including snippets of text that have been recognized from the audio signal and that include the query term.

* * * * *